July 4, 1950 G. J. STREZYNSKI 2,513,686
BEARING ASSEMBLY
Filed Jan. 25, 1947

INVENTOR
GEORGE J. STREZYNSKI
BY
Cyrus G. Hapgood
ATTORNEY

Patented July 4, 1950

2,513,686

UNITED STATES PATENT OFFICE 2,513,686

BEARING ASSEMBLY

George J. Strezynski, Chicago, Ill., assignor to The De Laval Separator Company, New York, N. Y., a corporation of New Jersey Application January 25, 1947, Serial No. 724,370

7 Claims. (Cl. 308—227)

This invention relates to assemblies for transmitting an axial thrust between rotating and non-rotating members, and more particularly to a novel bearing assembly for this purpose which affords improved facilities for lubrication and maintenance, and is adapted to accommodate lateral movement between the rotating and non-rotating members.

For illustrative purposes, the invention will be described in connection with a bearing assembly especially suited for use in transmitting an axial thrust from a non-rotating member to a plunger for operating discharge valves of a centrifugal bowl and which, therefore, rotates at high speed with the bowl, as disclosed, for example, in my copending application Serial No. 654,894, filed March 16, 1946, now matured into Patent Number 2,488,746 issued November 22, 1949. It will be understood, however, that the invention is adapted for other uses as well.

The valve plunger in centrifugal bowls of the character described is located on the axis of rotation of the bowl and is actuated by a non-rotating member, such as a piston, movable in the direction of the axis of rotation so that the plunger is alternately engaged and disengaged by a bearing assembly on the non-rotating member. In such bearing assemblies, it is important to maintain adequate lubrication of the bearing parts, because of the high speed of rotation of the valve plunger and the intermittent axial forces between the plunger and the bearing assembly. Also, since the valve plunger generally tends to rotate with some degree of lateral movement, it is highly desirable to provide means for accommodating this lateral movement when the bearing assembly engages the rapidly rotating plunger.

One object of the present invention, therefore, resides in the provision of a bearing assembly of the character described, having improved means for effectively retaining a lubricant in the assembly and for conveniently introducing the lubricant thereto.

Another object of the invention is to provide a bearing assembly of the character described, in which the bearing is loosely arranged in a head on one of the relatively movable members, so that the bearing is movable laterally in the head to accommodate eccentricities of the rotating member while retaining the lubricant in the assembly.

Figure 1:
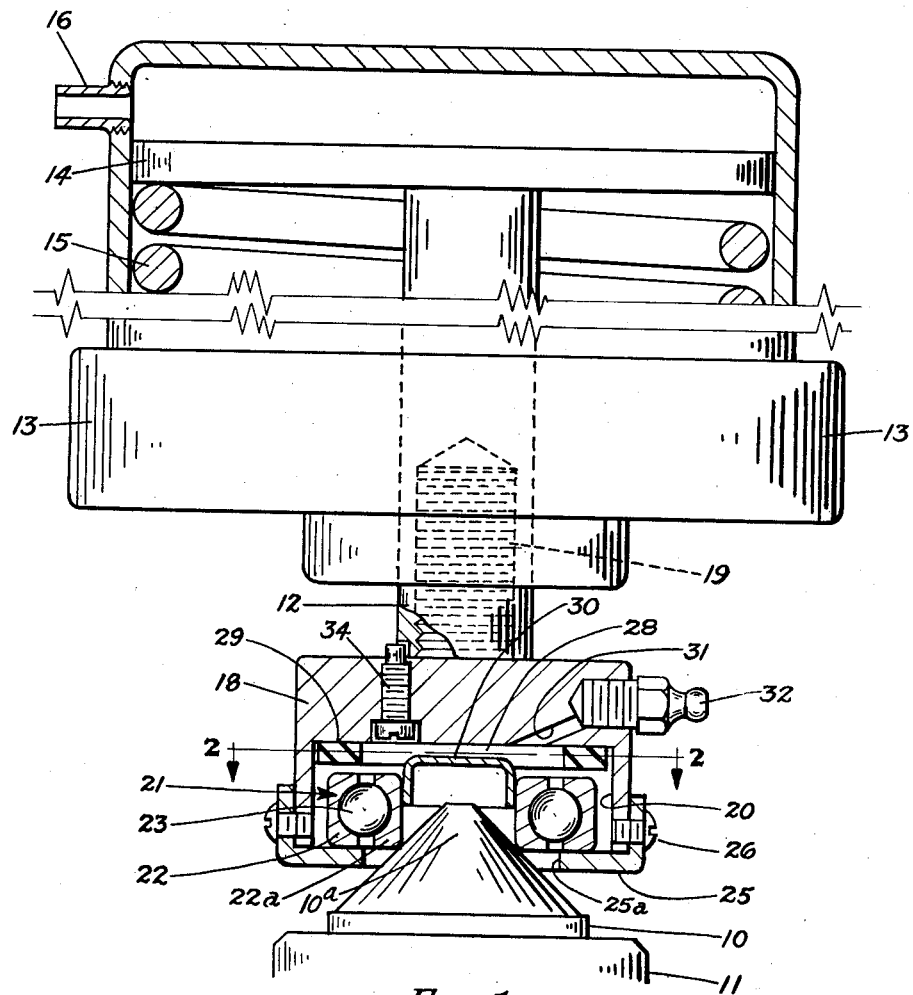
Figure 2:
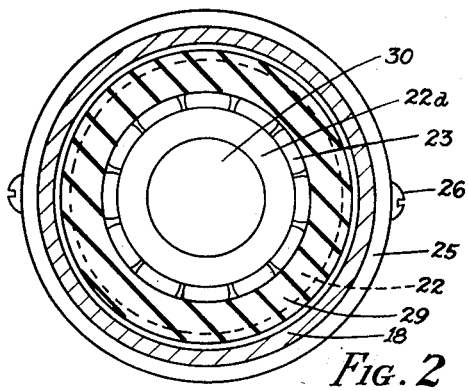

These and other objects of the invention may be better understood by reference to the accompanying drawing, in which Fig. 1 is a sectional view of one form of the new bearing assembly, and Fig. 2 is a sectional view on the line 2—2 in Fig. 1.

Referring to the drawing, the numeral 10 designates a valve plunger projecting from the upper end of a centrifugal bowl 11 and rotatable with the bowl. The rotating plunger 10 is adapted to be depressed by downward movement of a piston rod 12 projecting through the lower end of a cylinder 13. A piston 14 in the cylinder is connected to the upper end of rod 12 and is normally urged upwardly by a compression spring 15, to retract the rod. The piston 14 is moved downward against the action of spring 15 by fluid pressure on the upper face of the piston, the pressure fluid being admitted to the cylinder through a duct 16 under control of a suitable valve (not shown). It will be understood that after the rotating plunger 10 has been depressed by downward movement of the piston 14, subsequent upward movement of the piston will cause the plunger to be raised automatically to its initial position by the action of a compression spring, or the like, in centrifugal bowl 11.

The bearing assembly is located between the rotating plunger 10 and the non-rotating rod 12, to transmit the axial thrust of the latter to the plunger. The assembly comprises a cylindrical head 18 having a central stem 19 projecting from its upper end and threaded into the lower end of rod 12. At its lower end portion, the head 18 is provided with a recess 20 for receiving a bearing 21. The bearing, as shown, comprises a pair of annular concentric races 22 and 22a and bearing elements, such as ball bearings 23, held between the races. The bearing 21 is arranged loosely in the recess 20 so that it is movable both laterally and axially relative to the head, as will be described in greater detail presently.

In order to retain the bearing 21 in recess 20, I provide an end piece 25 over the mouth of the recess, that is, at the lower end of the head. The end piece 25 has a central opening 25a leading to the interior of the inner race 22a and adapted to receive the tapered or conical centering element 10a at the upper end of the plunger 10. However, the diameter of opening 25a is substantially greater than that of the plunger so as to allow relative lateral movement between the plunger and the head 18. The end piece 25 is removably mounted on the head by screws 26.

A clearance space 28 is provided between the upper end of bearing 21 and the opposing wall of recess 20. The clearance space 28 is surrounded by a hard fibre washer 29 which is normally spaced above the bearing but is engagable with the outer race 22 upon upward movement of the bearing in the head. The bearing and the washer 29 are so dimensioned that the inner race 22a cannot engage the washer in the movement of the bearing in recess 20. A closure in the form of a cup-shaped cap 30 is mounted in the inner race 22a, as by means of a press fit, and serves to divide the clearance space 28 from the interior of the inner race. At its upper end, the clearance space 28 communciates with a passage 31 leading outwardly to the periphery of the head, the outer end of the passage being normally closed by a grease fitting 32.

Preferably, the head 18 is locked to the piston rod 12 by means of a screw 34 projecting from the top of the head into a notch in the rod. The head of the lock screw 34 is accessible only through the recess 20, whereby loosening or removal of the head 18 is prevented except by disassembling the bearing assembly.

In the use of the new assembly, grease is introduced into recess 20 through the passage 31 in the head, the grease filling the clearance space 28 and the space around the periphery of the outer race 22. Also, the ball bearings 23 can receive lubrication directly from the clearance space 28 through the space between the inner and outer races. However, in the normal position of the bearing, as shown, the grease is retained in these spaces by the closure 30 in the inner race and also by the fact that the races are impervious so that they form grease shields, thereby preventing the passage of grease into the interior of the inner race and through the bottom opening 25a.

When the piston rod 12 descends, the tapered end 10a of the rotating plunger 10 enters the inner race 22a and engages the lower end of this race, the bearing automatically centering itself on the tapered end the plunger. The bearing then moves upwardly in recess 20 until the outer race 22 engages the washer 29. During this upward movement of the bearing, and while it is resting against the washer 29 in the downward movement of the plunger, it is free to move laterally in the head to accommodate any eccentricity in the rotation of the plunger. The washer 29 acts as a means for limiting upward movement of the bearing in the head, so as to maintain the clearance space 28 for the grease and also prevent engagement of the rotating closure cap 30 with the head. When the piston rod 12 is again elevated and the plunger 10 has returned to its initial position, the bearing 21 will seat on the end piece 25 and be withdraw from the tapered end of the plunger.

It will be apparent that the new bearing assembly has a simple and compact construction which can be easily and completely lubricated through the passage 31 and which is adapted to retain the lubrication in the head under normal conditions of use.

I claim:

1. In an assembly for transmitting an axial thrust between rotating and non-rotating members, the combination of a head adapted to be mounted on one of said members and having a recess in one end, a bearing in said recess including a pair of annular concentric races and bearing elements between the races, the inner race being adapted to receive the other of said members, and end piece removably mounted on the head for retaining the bearing in the recess, the end piece having an opening aligned with the interior of the inner race and adapted to receive said other member, and a releasable device in the head for locking the head to one of said members and accessible through the recess to unlock the head.

2. A combination as defined in claim 1, comprising also a closure in the inner race for dividing the interior thereof from a lubricant space between the inner end of the bearing and the opposing wall of the recess.

3. In combination, a pair of members movable relatively both in rotation and in the direction of the axis of rotation, one of said members having a tapered end, a head on the other member and having a recess facing said tapered end, a bearing in the recess including a pair of annular concentric races and bearing elements between the races, said tapered end being movable into and out of the hollow portion of the inner race and being engagable therewith, the bearing arranged loosely in the recess for both lateral and axial movement relative to the head, a closure for dividing the interior of the inner race from a clearance space between the inner end of the bearing and the opposing wall of the recess, the head having a passage leading from an outer wall of the head for introducing a lubricant into said clearance space, limiting means in the recess engagable by the outer race, upon axial movement of the bearing relative to the head, to maintain said clearance space, and end piece removably mounted on the head for retaining the bearing in the recess, the end piece having an opening aligned with the interior of the inner race and substantially wider than said tapered end to permit lateral movement thereof relative to the head, and a releasable device for locking the head to said other member and accessible through the recess to unlock the head.

4. In an assembly for transmitting an axial thrust between rotating and non-rotating members one of which has a conical centering element, the combination of a head adapted to be mounted on the other of said members and having a recess in one end, a bearing arranged loosely in the recess for both lateral and axial movement relative to the head and including a pair of annular concentric races and bearing elements between the races, there being a lubricant space between the inner end of the bearing and the opposing wall of the recess, a cup-shaped closure cap in the inner race for dividing the interior thereof from said clearance space in the recess, the cap defining with the inner race a space for receiving said centering element, the inner race being engageable with the centering element while maintaining the same spaced from the closure cap, and limiting means in the recess engageable by the outer race, upon axial movement of the bearing relative to the head, to maintain said clearance space and hold the cap out of engagement with said opposing wall of the recess.

5. A combination according to claim 1, in which the bearing is arranged loosely in said recess for lateral movement therein.

6. A combination according to claim 1, in which the bearing is arranged loosely in said recess for both lateral and axial movement relative to the head.

7. A combination according to claim 1, in which said opening in the end piece is substantially wider than the interior of the inner race.

GEORGE J. STREZYNSKI.

REFERENCES CITED

The following references are of record in the file of this patent:

UNITED STATES PATENTS

| Number | Name | Date |
|---|---|---|
| 2,249,501 | Teker | July 15, 1941 |